US012563041B2

(12) United States Patent
Cho et al.

(10) Patent No.: US 12,563,041 B2
(45) Date of Patent: Feb. 24, 2026

(54) SYSTEM AND METHOD FOR GLOBAL RATE LIMITING

(71) Applicant: Salesforce, Inc., San Francisco, CA (US)

(72) Inventors: Daeki Cho, Bellevue, WA (US); Ran Yao, San Francisco, CA (US); Xiaoyuan Zhou, Bellevue, WA (US); Alekhaya Kondapuram, San Francisco, CA (US); Tony Wong, San Francisco, CA (US); Pratima Nambiar, San Francisco, CA (US); Rama Chavali, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 171 days.

(21) Appl. No.: 18/243,857

(22) Filed: Sep. 8, 2023

(65) Prior Publication Data

US 2025/0088509 A1     Mar. 13, 2025

(51) Int. Cl.
*H04L 9/40*          (2022.01)
*H04L 69/22*         (2022.01)

(52) U.S. Cl.
CPC .............. *H04L 63/10* (2013.01); *H04L 69/22* (2013.01)

(58) Field of Classification Search
CPC ................................ H04L 63/10; H04L 69/22
See application file for complete search history.

(56) References Cited

U.S. PATENT DOCUMENTS

| | | | |
|---|---|---|---|
| 12,095,794 B1 * | 9/2024 | Karaje | .................. H04L 63/10 |
| 2018/0375840 A1 * | 12/2018 | Moy | ....................... H04L 67/63 |
| 2020/0059471 A1 * | 2/2020 | Farrell | ................... H04L 63/10 |
| 2020/0322358 A1 * | 10/2020 | Farrell | ................... H04L 63/10 |
| 2021/0044672 A1 * | 2/2021 | Gilling | ................... H04L 69/22 |
| 2021/0306217 A1 * | 9/2021 | Paiva | .................. H04L 41/5009 |
| 2021/0318917 A1 * | 10/2021 | Cooke | .................. G06F 9/5027 |
| 2023/0015697 A1 * | 1/2023 | Krishnan | ................ H04L 63/10 |
| 2023/0259415 A1 * | 8/2023 | Kairali | .................... G06F 9/547 |
| | | | 719/328 |
| 2024/0152917 A1 * | 5/2024 | Singh | ........................ H04L 9/50 |
| 2025/0077323 A1 * | 3/2025 | Palanivel | .................. G06F 8/22 |
| 2025/0088509 A1 * | 3/2025 | Cho | ........................ H04L 63/10 |

FOREIGN PATENT DOCUMENTS

WO     WO-2008005038 A1 *   1/2008  ............. H04L 51/58

* cited by examiner

*Primary Examiner* — Richard G Keehn
(74) *Attorney, Agent, or Firm* — Sterne, Kessler, Goldstein & Fox P.L.L.C.

(57)          ABSTRACT
Disclosed herein are system, method, and computer program product embodiments for implementing global rate limiting of an API cluster capable of dynamically implementing updates without a restart of any instantiation within the API cluster. A local service includes an envoy and a customer resource definition. When an update is received, the customer resource definition identifies changes to be made to a global rate limiting service and dynamically injects those changes into the global rate limiting service. The changes can be instance-specific, with multiple different versions stored for the various instantiations within the cluster. The envoy also extracts and converts header information from a received request into one or more descriptor keys. The global rate limiting service determine global rate limiting based on a set of rules applied to the descriptor keys.

20 Claims, 8 Drawing Sheets

300

600

Computer System 800

SYSTEM AND METHOD FOR GLOBAL RATE LIMITING

BACKGROUND

One or more implementations relate to the field of Application Programming Interfaces (APIs), and more specifically to application of API traffic rate limiting policies.

As connectivity between mobile devices and other computing platforms continues to develop, applications have been developed that communicate and share information. Commonly, applications may communicate via an Application Programming Interface (API). An API is a software interface offering a service to other programs to communicate data. APIs may have several different components, such as specifications, markdown documents, etc. that constitute part of an API's development.

An API Gateway is an API management tool that sits between API clients and backend services, transmitting API requests from clients to appropriate services provided by API endpoints and transmitting API responses back to clients for requested services. API Gateways may be used to manage API request traffic in order to ensure that the internal resources (e.g., servers, databases, etc.) have capacity to handle the requests and are not overloaded. This functionality may be implemented using a rate limiting policy that defines the number of requests an API may allow in a specific time window. Typically, rate limiting is performed on a local instance-specific scale, since different API instances are not usually aware of the occurrences at other instances.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
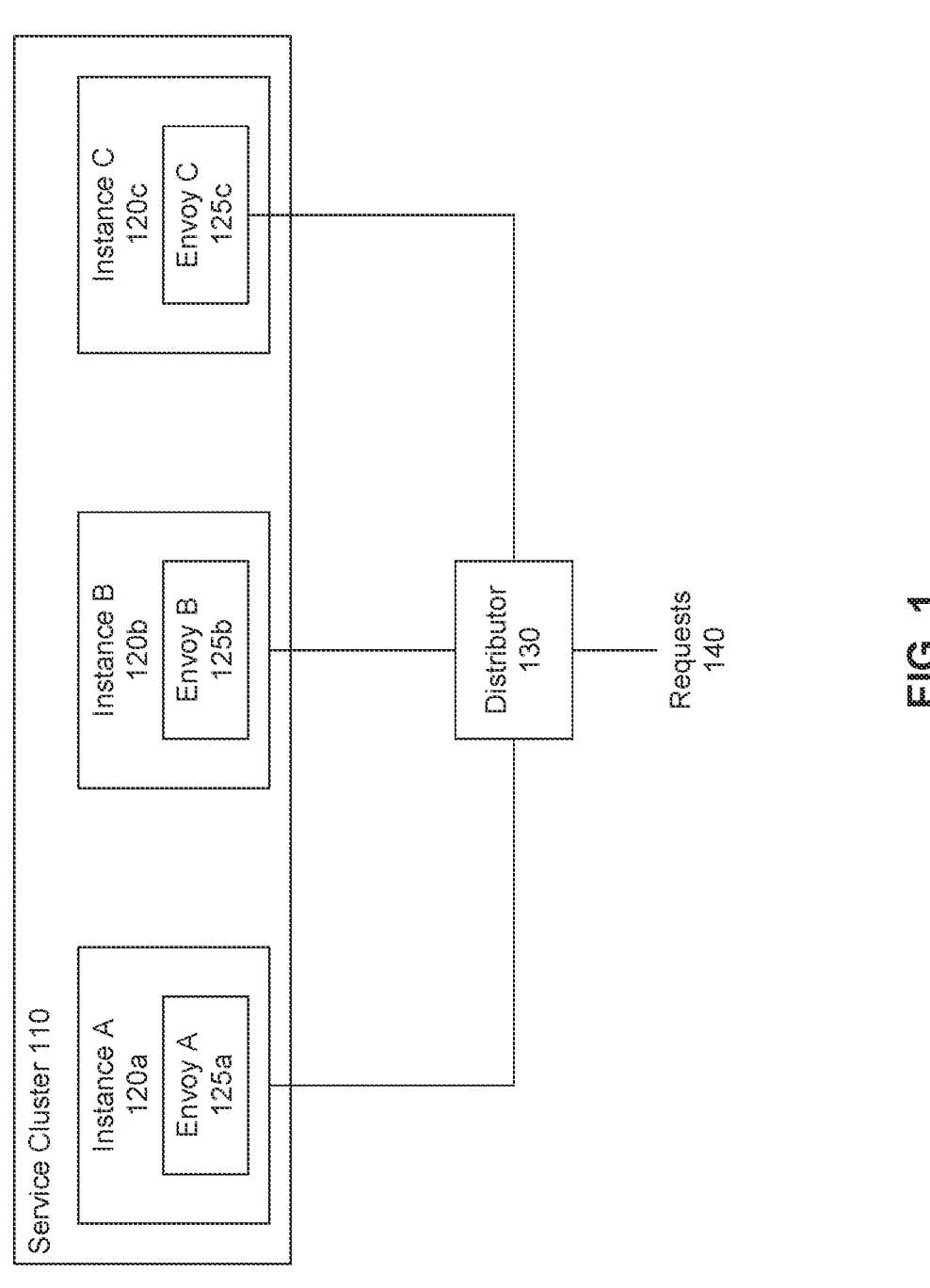
FIG. 1 illustrates a block diagram of an Application Programming Interface (API) environment, according to some embodiments.

Provided herein are system, apparatus, device, method and/or computer program product embodiments, and/or combinations and sub-combinations thereof, for implementing statistical distributed rate limiting for gateways in an API environment.

As connectivity between mobile devices and other computing platforms continues to develop, applications have been developed that communicate and share information. Commonly, applications may communicate via an Application Programming Interface (API). An API is a software interface offering a service to other programs to communicate data. APIs may have several different components, such as specifications, markdown documents, etc. that constitute part of an API's development.

An API Gateway is an API management tool that sits between API clients and backend services, transmitting API requests from clients to appropriate services provided by API endpoints and transmitting API responses back to clients for requested services. API Gateways may be used to manage API request traffic in order to ensure that the internal resources (e.g., servers, databases, etc.) have capacity to handle the requests and are not overloaded. This functionality may be implemented using a rate limiting policy that defines the number of requests an API may allow in a specific time window. Typically, rate limiting is performed on a local instance-specific scale, since different API instances are not usually aware of the occurrences at other instances.

As discussed above, one function of an API Gateway may be to manage API traffic in order to protect the health of an API and ensure proper function by ensuring that every backend resource (e.g., servers, databases, etc.) has capacity to serve each request. Rate limiting can also be used for business operations. For example, a customer can purchase a set unit time access to a particular API. The customer can then stop at the prepaid limit without incurring additional costs. Typically, these benefits are achieved by implementing a rate limiting policy, which defines how many requests an API will allow in a specific time window (e.g., for the Orders API, allow a maximum of 1000 requests per minute).

For example, an API Gateway and rate limiting policy may be deployed to manage API traffic for a particular API that may be serviced by several backend servers. The API Gateway may be configured as a gateway cluster comprising several API Gateway nodes and each API Gateway node may correspond to a backend server. The rate limiting policy may indicate that the API will only allow a maximum of 1000 requests per minute. In one configuration, a global rate limiter applies a rate limit to the API as a whole (not individual servers) and the API requests are distributed across the multiple servers. In this configuration, in order to track the number of requests handled by each of the different servers, the different API Gateway nodes must somehow communicate with each other and with the API Gateway such that each API Gateway node is aware of the status of every other active node in the cluster at any given point. This can result in costly computational overhead leading to increased latency.

Therefore, there is a need for a global rate limiter that can be applied to a cluster of API instances without the costly overhead of previous solutions. Additionally, there is often a configuration mismatch between the envoys (e.g., API gateway) located at the individual API instances and the global rate limiter. In other words, when an envoy is updated, those updates need to also be made to the global rate limiter in order to ensure consistency. This situation becomes even more complicated when less than all of the local envoys are updated. In this scenario, the global rate limiter must not only be updated for those newly-updated envoys, but must also maintain previous configurations for non-updated envoys. Therefore, there is a need for a maintenance configuration that solves these additional technological issues.

FIG. 1 illustrates a block diagram of an Application Programming Interface (API) environment 100, according to some embodiments. As shown in FIG. 1, The environment 100 includes a service cluster 110 that includes multiple instances 120 of a protectable service. In the example of FIG. 1, there are three instances of the service running in the cluster 110, including instance A 120a, instance B 120b, and instance C 120c. Each instance 120 of the protectable service includes an envoy (e.g., gateway) 125. For example, instance A 120a includes envoy A 125a, instance B 120b includes envoy B 125b, and instance C 120c includes envoy C 125c. A distributer 130 is positioned outside the cluster for distributing incoming requests 140 to the various instances 120. In an embodiment, the distributer 130 distributes the requests in a round-robin fashion, cycling through the different instances for each successive request 140.

In operation, a request 140 is received from a network (not shown) at the distributer 130. The distributer 130 determines a next instance 120 in the queue and forwards the request to that instance 120 for processing. The request is then received at the selected instance (instance A 120a in this example). The envoy 125a associated with that instance performs various gateway processes on the received request, including rate limiting. Specifically, each instance 120 may only be capable of supporting a predetermined number of requests within a certain time period. This may be due to processing capabilities, contracted amounts, etc. Therefore, the envoy 125 checks after each request as to whether a predetermined maximum number of requests within a predetermined time period has been met. Once the maximum has been met, future requests are denied. Similar functionality occurs at each of the other instances 120b and 120c.

Figure 2:
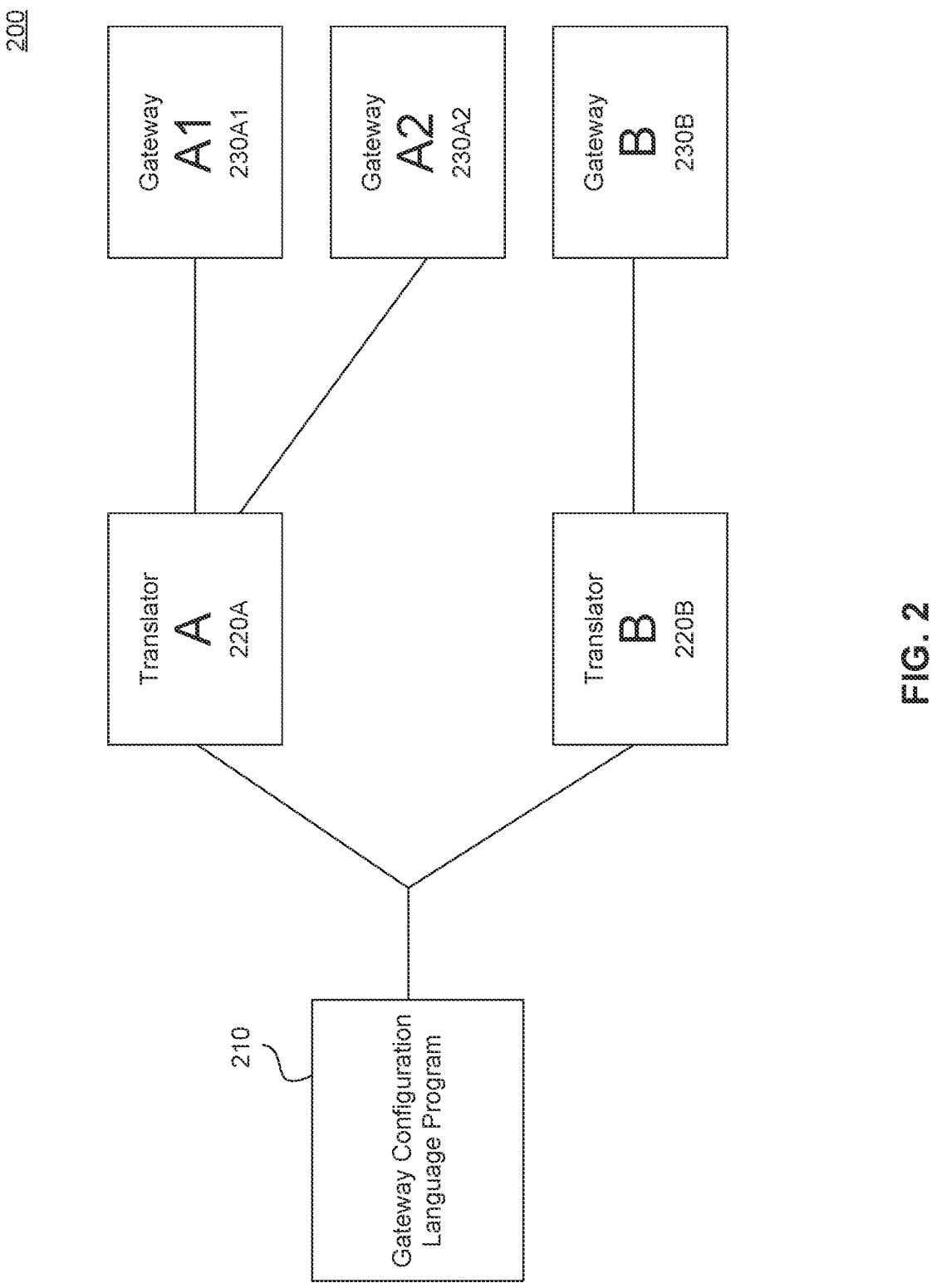
FIG. 2 illustrates a block diagram of an exemplary implementation of an API Gateway cluster configuration in an API environment, according to some embodiments.

FIG. 2 illustrates a block diagram of an exemplary implementation of an API Gateway cluster 200 configuration in an API environment, according to some embodiments. As shown in FIG. 2, API Gateway cluster 206 protects API X and the resources that provide the backend services that may be accessed via API X. The resources may include servers 210 and database 212. Gateway cluster 206 may comprise several API Gateway nodes 208 corresponding to servers 210.

In some embodiments, API clients 204a and 204b may send API requests to API X to access backend resources provided by servers 210. Each of the API requests may be received by an API Gateway node 208. As described above an API Gateway 208 may serve multiple functions including authentication, routing, rate limiting, monitoring, analytics, policies, etc. Each API Gateway node also performs these same services. However, instead of one gateway performing these functions for the whole API, each gateway node 208 serves a server 210. This allows for more reliable horizontal scalability. However, configuring an API Gateway this way also creates some challenges.

As described above, a key function of an API Gateway is implementation of rate limiting policies for an API. In a non-clustered configuration, all API requests for an API are routed through the single API Gateway. As such, the gateway has full insight to the rate of API requests being received by the API and thus can apply the API's rate limiting policy with no need for additional information. However, in an API Gateway cluster, API requests are routed through multiple gateway nodes 208. Accordingly, each gateway node 208 only has insight into the number of API requests it receives. This poses a problem because distributed rate limiting requires the ability to count request at cluster level, not at a node level. A similar problem arises when it is desired to track the requests of a particular customer, since those requests may be shared across several different instances.

Figure 3:
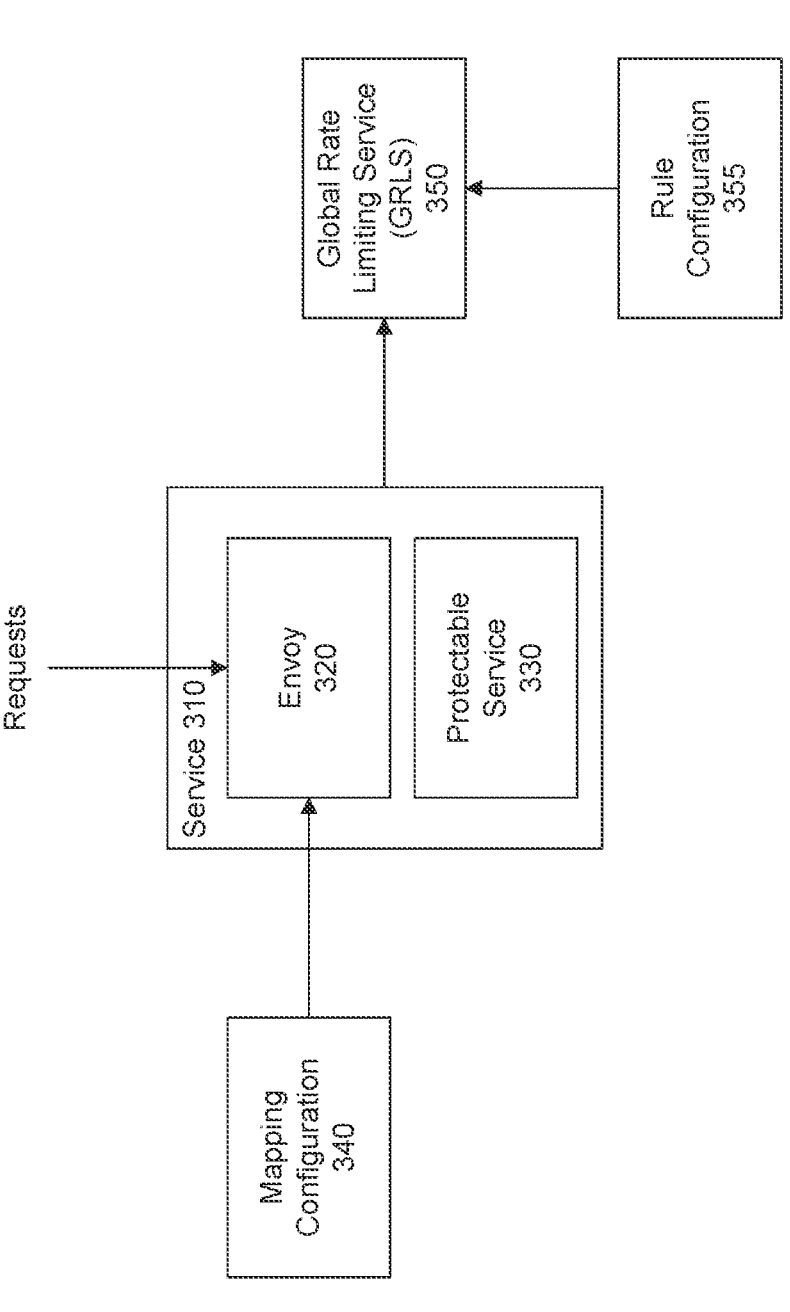
FIG. 3 illustrates a block diagram of an exemplary Global Rate Limiter configuration, according to some embodiments.

FIG. 3 illustrates a block diagram of an exemplary Global Rate Limiter configuration 300, according to some embodiments. As shown in FIG. 3, a service instantiation 310 includes a local envoy 320 in front of a protectable service 330. A mapping config file 340 is associated with the local envoy 320, which may be stored remotely or locally within local memory (not shown) of the service 310. The service 310 is also communicably coupled to the Global Rate Limiting Service (GRLS) 350. The GRLS 350 includes a Rule Config file 355, which may be stored remotely or locally within local memory of the GRLS 355 (not shown).

In operation, the service 310 receives a request from a user (either directly or via a distributer). The request is provided to the local envoy 320. The envoy 320 may perform local rate limiting, but also provides the request to the GRLS 350 for global rate limiting. In order to carry out this function, the envoy 320 first maps a header of the request to a particular rule. In particular, when a request is received, the request includes a header that defines certain metadata with respect to the request. Such metadata may include a header name and a descriptor key, for example, that define the kinds of rules that need to be applied to the request.

The envoy 320 extracts this header metadata information, and then applies the applies the mapping config file 340 to the extracted information. The mapping config file 340 defines how the envoy 320 maps headers of received requests to rules of global rate limiting. As a result of this check, the envoy 320 determines whether global rate limiting is needed for the request. For example, only certain requests may be subject to global rate limiting, such as those by a particular customer, those at certain times of day, etc. Once this determination has been made, the envoy 320 forwards the determined rule to the GRLS 350.

The GRLS 350 receives the relevant information from the envoy 320. In some embodiments, this may include the entire request, whereas in others it merely includes the extracted metadata. The GRLS then compares the applied the received information to the rule config file 355 in order to determine whether to restrict the request from being processed. The GRLS 350 then communicates a result of this determination back to the envoy, which implements the resulting the decision. Specifically, if the GRLS 350 responds that the request can be processed, then the envoy 320 performs local rate limiting and either processes or rejects the request based on the decision of the local rate limiting. In another embodiment, local rate limiting is performed at the envoy 320 prior to applying the mapping config file 340.

If the request is approved, then it is passed to the protectable service 330 for processing. On the other hand, if the request is denied, then the request is rejected and not processed.

In embodiments, a complication arises when updates need to be made to either the mapping config 340 or the rule config 355. This can occur, for example, whenever the envoy 320 is updated. When this happens, there may be a mismatch between the mapping config file 340 and the rule config file 355. As a result, incoming requests may be improperly processed for global rate limiting. In other words, the determinations made by the envoy based on the updated mapping config file 340 may not align with rule config file 355 of the GRLS 350. As a result, some incoming requests may be incorrectly rejected while others may be incorrectly processed.

To provide an example of the above, a request received at the service 310 is received by the envoy 320. The envoy 320 extracts the header information from the request. In this example, the header contains a customer ID='xorg'. In order to determine how to treat this request, the envoy checks the customer ID against the mapping config file 340. The mapping config file 340 provides the descriptor keys that will be used by the GRLS 350. In other words, using the mapping config file 340, the envoy 320 converts the header information to descriptors that can be understood by the GRLS, and specifically by the rule config file 355. This information is then forwarded to the GRLS 350 for processing.

Figure 4:
FIG. 4 illustrates a block diagram of an exemplary Global Rate Limiter configuration according to some embodiments.
Figure 4:
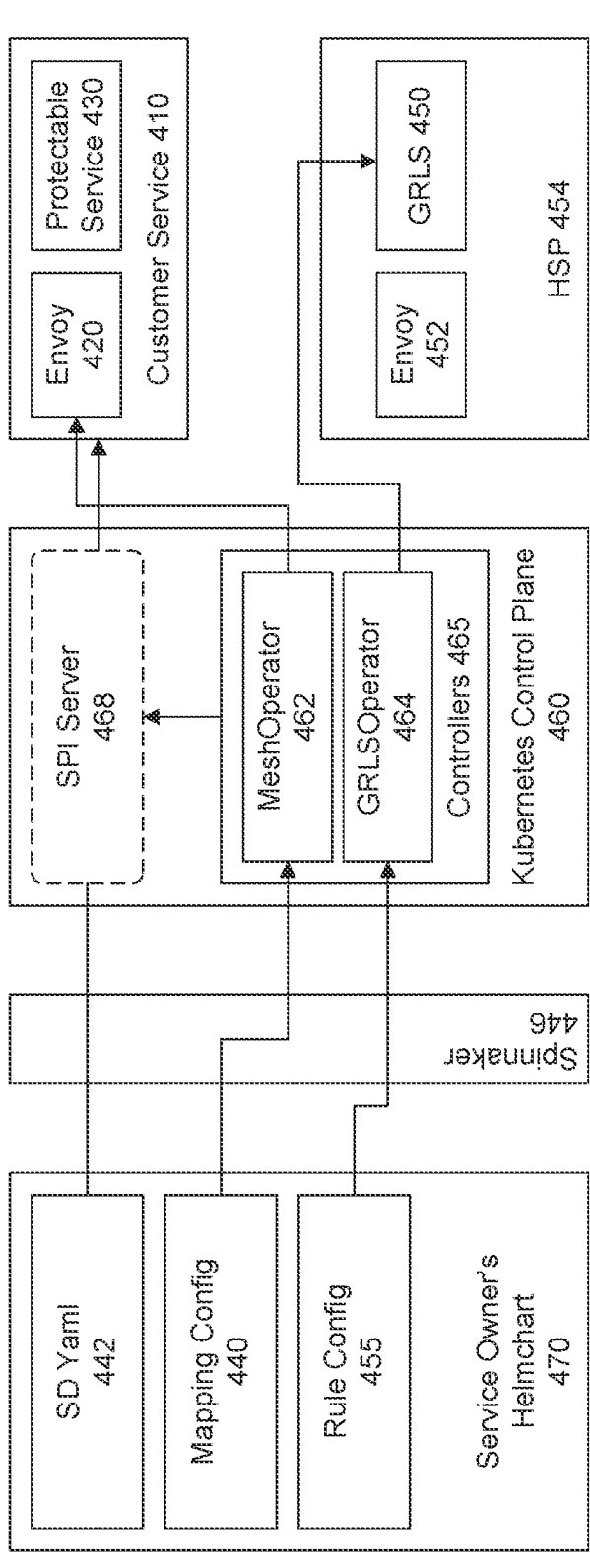

FIG. 4 illustrates a block diagram of an exemplary Global Rate Limiter configuration according to some embodiments. As shown in FIG. 4, a service 410 includes an envoy 420 configured to receive requests and perform local rate limiting. The service 410 also includes the protectable service 430 that performs the desired functionality that is the target of the request. A hyperforce service protection (HSP) 454 includes a GRLS 450 and corresponding envoy 452. The GRLS 450 is in communication with the envoy 420 and performs global rate limiting operations on description information received from the envoy 420.

A service owner's helmchart 470 includes a service and deployment Yet Another Markup Language (YAML) 442, a mapping config file 440 associated with the envoy 420 for performing the mapping of header information from the received requests, and a rule config file 455 associated with the GRLS 450. In an embodiment, the helmchart 470 is deployed alongside the protectable service 430. In an embodiment, the mapping config file 440 and the rule config file 455 (e.g., customer resource definitions) are deployed with a delivery platform 446 for releasing software changes with high velocity and confidence. In an embodiment, the delivery platform 446 is configured as a Spinnaker delivery platform.

A deployment system 460 is deployed between the spinnaker 446 and the HSP 454 and customer service 410. In an embodiment, the deployment platform 460 is a kubernetes system, which is an open-source system for automating deployment, scaling, and management of containerized applications. As shown in FIG. 4, the Kubernetes includes an API server 468, as well as controllers 465. The controllers 465 include a MeshOperator 462 and a GRLSOperator 464. In an embodiment, the MeshOperator 462 is implemented in order to interpret the mapping config file 440 associated with the service 410 and the GRLSOperator 464 is implemented in order to interpret the rule config file 455 associated with the GRLS 450.

In operation, the mapping config file 440 is deployed via Spinnaker 446 and intercepted by MeshOperator 462. The MeshOperator 462 interprets the information included in the mapping config file 440 and provides the relevant information to the envoy 420. Similar to the configuration of FIG. 3, the envoy 420 extracts the relevant header information from a received request. The envoy 420 then uses the mapping config information received from the MeshOperator 462 to convert the header information to descriptor keys that will be used by the GRLS 450 for global rate limiting. In some embodiments, the envoy 420 makes an initial determination at this time as to whether a global rate limiting check is needed. In other embodiments, the envoy 420 transmits all converted header information to the GRLS 450 for processing.

Similarly, the rule config file 455 is deployed via Spinnaker 446 and intercepted by the GRLSOperator 464. The GRLSOperator 464 interprets the information included in the rule config file 455 and provides the relevant information to the envoy 420. The GRLS 450 receives the descriptor data from the envoy 420. The GRLS 450 uses the rule config information received from the GRLSOperator 464 in order to determine whether the request needs to be globally rate limited. As discussed above, this cooperation between the envoy 420 and the GRLS 450 relies on a consistency between the mapping config file 440 and the rule config file 455. Specifically, if service 410 is updated and the mapping config file 440 is changed, those changes may be inconsistent with the operations of the rule config file 455.

In order to maintain this consistency, the Customer Resource Definitions (e.g., mapping config 440 and rule config 455) are included within the service 410. The CRDs includes rule configuration information corresponding to the rule config file 455 and the mapping config file 440. When a service owner deploys the service, the configuration of the CRD is dynamically injected into the GRLS 450. Thus, when an update to the service 410 occurs, and the service is re-deployed, the CRD will automatically and dynamically inject the new config into the GRLS 450 so that the service 410 does not have to be restarted. Additionally, by linking the configurations at the service 410 with those of the GRLS 450, all configuration updates can occur at the service (e.g., user side) rather than updates needing to be made in multiple locations in order to maintain consistency.

In some embodiments, the GRLS 450 may be configured to perform global rate limiting for several instances of the service within a cluster. In some scenarios, less than all of those instances may be updated at any given time. In other words, one or more of the instances may be using earlier versions of the config file. As a result, updates received from the CRD may be stored in association with the an identification of the instance from which the update was received. In other words, the GRLS 450 tracks the versions associated with different instances so that global rate limiting processing can be accurately performed for each instance regardless of the config file version they maintain.

Figure 5:
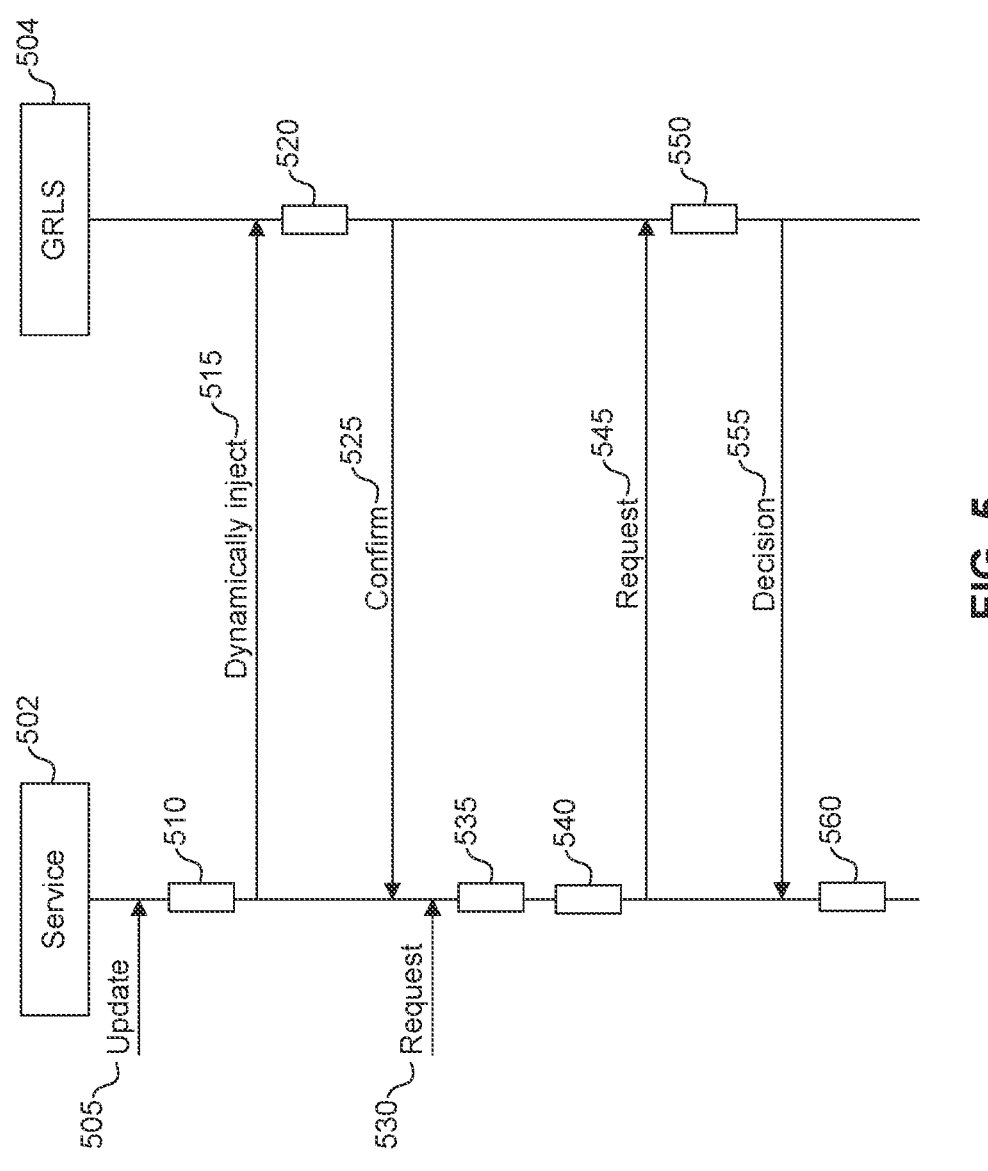
FIG. 5 illustrates a process flow diagram of an exemplary global rate limiting process, according to embodiments of the present disclosure.

FIG. 5 illustrates a process flow diagram 500 of an exemplary global rate limiting process, according to embodiments of the present disclosure. As shown in FIG. 5, the process occurs between a service 502 and a GRLS 504, which may correspond to exemplary embodiments of service 410 and GRLS 450 of FIG. 4.

The process begins by the service 502 receiving a configuration update 505. From the update, the service performs an updating process 510 in order to update the configurations both in the mapping config file 440 as well as the CRD. Based on this update, the CRD dynamically injects the rule updates to the GRLS 504. In an embodiment, the update is made to a rule config file associated with the GRLS 504, such as rule config file 455.

The GRLS 504 performs an update process 520 to dynamically update the rule config file, and then transmits a confirmation message 525 back to the CRD. In this manner, consistency between the config files located at the service 502 and the GRLS 504 can be maintained without having to restart the service 502.

Once the GRLS has been updated consistent with the updates to the service 502, rate limit processing can resume. For example, as shown in FIG. 5, a request is received at the service 502 that includes a header containing certain metadata information. An envoy at the service 502, such as envoy 420, performs a process 535 to extract the header information from the request. The service 502 then performs a conversion function 540 based on the extracted header information and the mapping config file 440 in order to convert the received header information to descriptors that can be understood by the GRLS 504. Thereafter, the service 502 transmits a request 545 to the GRLS 504 that includes the descriptors.

The GRLS 504 receives the request 545 and performs a Global Rate Limiting process 550 in order to determine whether the request should be limited (e.g., restricted from processing). In embodiments, this check includes comparing the received descriptors to the rule config file 455. As a result of this process, the GRLS 504 will make a determination as to whether the request should be limited. The GRLS 504 then transmits a decision message 555 back to the service 502. Upon receipt, the service 502 either processes or rejects the request based on the rate limiting decision of the GRLS 504.

Figure 6:
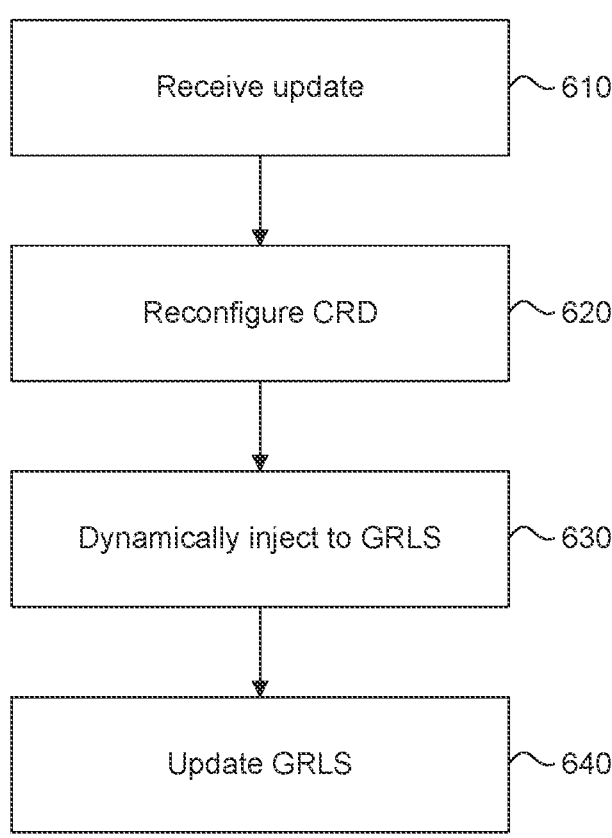
FIG. 6 illustrates a flowchart diagram of an exemplary method for maintaining consistency between the config files of the service and the GRLS according to embodiments of the present disclosure.

FIG. 6 illustrates a flowchart diagram of an exemplary method 600 for maintaining consistency between the config files of the service and the GRLS. As shown in FIG. 6, the method begins by the service receiving an update in step 610 to the config file. In step 620, a CRD located at the service is updated with the newly-updated configuration information.

In step 630, the CRD dynamically injects the new configuration information to the GRLS. The GRLS updates in config file based on the injected update information. In this manner, the GRLS maintains consistency with the service.

Figure 7:
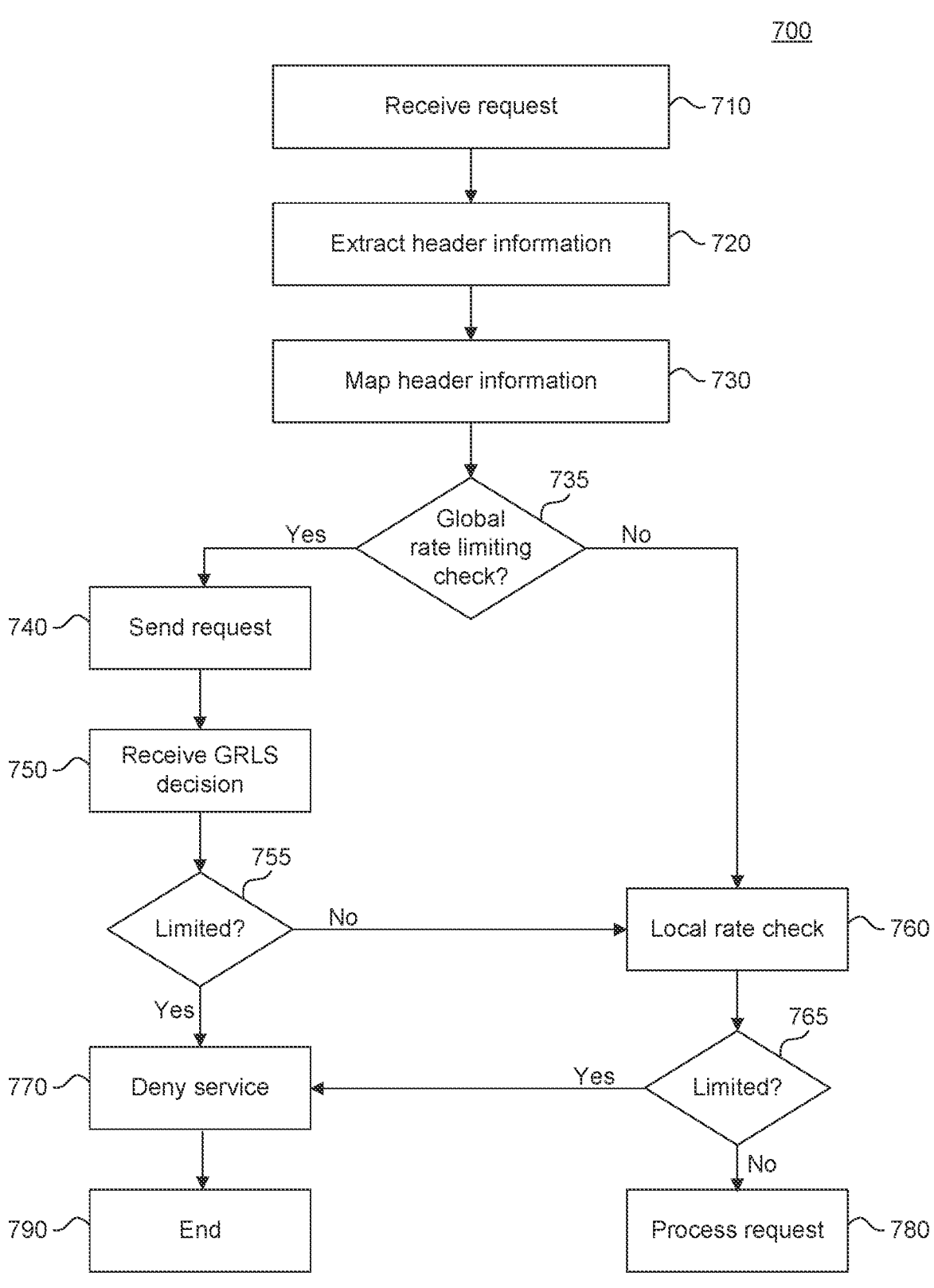
FIG. 7 illustrates a flowchart diagram of an exemplary method 700 for performing rate limiting of incoming requests at a service according to embodiments of the present disclosure.

FIG. 7 illustrates a flowchart diagram of an exemplary method 700 for performing rate limiting of incoming requests at a service. As shown in FIG. 7, the method begins at step 710, where the service receives a request. In an embodiment, the request includes a header containing certain metadata information.

In step 720, an envoy associated with the service extracts relevant header information from the header. In embodiments, this information may include a customer identifier.

In step 730, the envoy maps the header information to one or more descriptors. In an embodiment, this mapping is based on definitions included within a local mapping config file.

In step 735, the envoy determines based on the results of the mapping, whether a global rate limiting check must be performed. In other words, the envoy determines whether it is necessary to forward the received descriptors to the GRLS for processing. If the envoy determines that no global rate limiting check is needed (735—No), the envoy preforms a local rate check in step 760. Alternatively, if the envoy determines that a global rate limiting check is needed (735—Yes), then the envoy transmits a request message to the GRLS in step 740. In an embodiment, the request message includes the descriptors resulting from the mapped header information of step 730.

The GRLS receives the request and performs a global rate limiting check on the received descriptors to determine whether the service should process the request or not. The GRLS then transmits a reply message to the service that includes the global rate limiting decision (e.g., whether the request should be processed or rejected). The envoy receives the GRLS decision in step 750.

The envoy they determines whether the request is to be limited in step 755 based on the received GRLS decision. In other words, if the GRLS indicates that the request should be rejected (755—Yes), then the envoy denies service of the request in step 770 and the method ends in step 790. Alternatively, if the envoy determines that the request has passed the global rate limiting check (755—No), the a local rate check is performed in step 760.

In step 760, the envoy determines whether the instance of the service has met its processing capacity, and if so, denies service of the request. Therefore, in step 765, the envoy determines based on the local rate limiting whether to process the received request. If the envoy determines that the request should be rejected (765—Yes), then the envoy denies service to the request in step 770 and the method ends in step 790. Alternatively, if the envoy determines that the request should be processed (765—No), then the request is processed in step 780 and the method ends in step 790.

It will be understood that the order of the above steps are merely exemplary, and the steps can be rearranged in any appropriate manner. For example, in embodiments, the envoy may perform local rate limiting prior to mapping the header and conducting a global rate limiting check. Additionally, more or fewer steps may be included in the exemplary method consistent with the disclosure.

Figure 8:
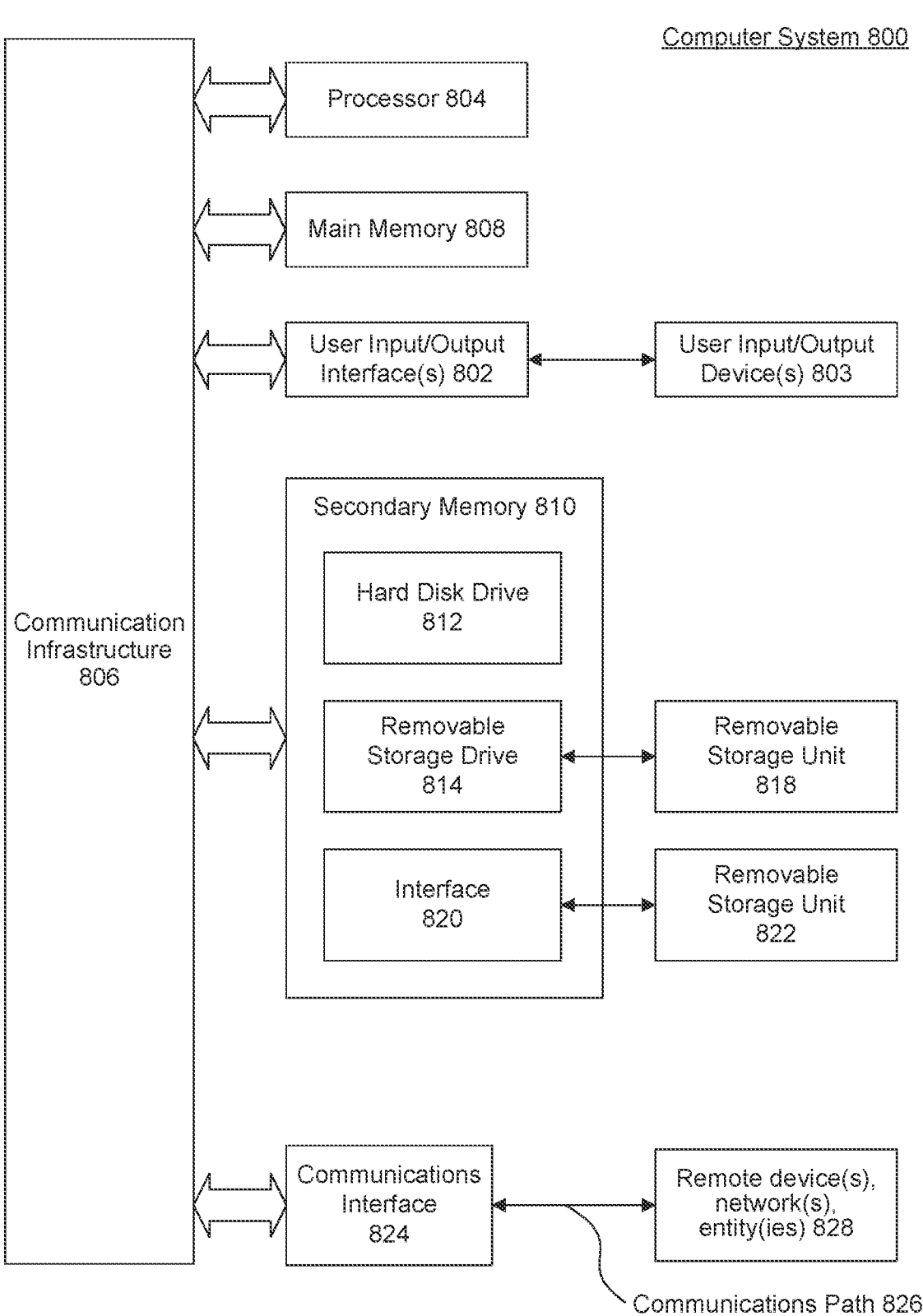
FIG. 8 illustrates a block diagram of an exemplary computer system for implementing one or more aspects of the disclosed embodiments according to various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include customer input/output device(s) 803, such as monitors, keyboards, pointing devices, etc., which may communicate with communication infrastructure 806 through customer input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random-access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system for global rate limiting, comprising:
a local envoy associated with a protectable service configured to:
    receive a request for access to the protectable service from a user;
    convert the received request, the converting including applying a mapping configuration file to header information of the received request to generate descriptor keys usable by a global rate limiting service;
    forward the converted request to the global rate limiting service;
    receive a response message from the global rate limiting service; and
    allow or reject access to the protectable service by the user based on the received response message.

2. The system of claim 1, further comprising the global rate limiting service configured to:
    receive the converted request from the local envoy;
    determine whether the request is rate limited based on a stored set of rules; and
    transmit the response message to the local envoy.

3. The system of claim 2, wherein the converting of the received request includes:
    extracting header information from the received request; and
    generating, from the extracted header information and based on information stored in a mapping config file, the descriptor keys associated with the request.

4. The system of claim 3, wherein the determining further includes comparing the received descriptor keys to a plurality of rules stored in a rule config file.

5. The system of claim 2, further comprising a customer resource definition collocated with the local envoy.

6. The system of claim 5, wherein the local envoy is further configured to receive an update, and
    wherein the customer resource definition is configured to:
        receive the update data related to the mapping config file;
        determine necessary changes to the rule config file of the global rate limiting service based on the received update data; and
        dynamically inject the changes to the global rate limiting service without restarting the envoy or the global rate limiting service.

7. The system of claim 6, wherein the global rate limiting service is configured to store the changes in association with the local envoy from which the update was received.

8. A method for performing global rate limiting in an application programming interface (API) environment, comprising:
    converting, by one or more computing devices at a local envoy, information about a request for access from a requestor to a protectable service at the local envoy to generate a descriptor key, the converting including applying a mapping configuration file to header information of the request to generate descriptor keys usable by a global rate limiting service;
    requesting, by the one or more computing devices at the local envoy, an access determination from the global rate limiting service based on the descriptor key;
    controlling, by the one or more computing devices at the local envoy, access to the protectable service by the requestor based on the access determination.

9. The method of claim 8, further comprising:
    receiving the converted request at the global rate limiting service;
    determining whether the request is rate limited based on a stored set of rules; and
    transmit a response message in response to the determining.

10. The method of claim 9, wherein the converting of the received request includes:
    extracting header information from the received request; and
    generating, from the extracted header information and based on information stored in a mapping config file, the descriptor keys associated with the request.

11. The method of claim 10, wherein the determining further includes comparing the received descriptor keys to a plurality of rules stored in a rule config file.

12. The method of claim 9, further comprising receiving an update that includes update data related to the mapping config file.

13. The method of claim 12, further comprising:
    determining, by a customer resource definition, necessary changes to a rule config file based on the received update data; and
    dynamically inject the changes to the global rate limiting service without restarting the protectable service.

14. The method of claim 13, further comprising storing separate update for each of a plurality of protectable services.

15. A global rate limiting system comprising:
a local server having one or more processors configured to:
    receive a request for a service located at the local server;
    perform a local rate limiting check of the request to determine whether the request can be processed according to local rate limiting rules;
    in response to the request passing the local rate limiting check:
        convert the request based on a local conversion file, the converting including applying a mapping configuration file to header information of the received request to generate descriptor keys usable by a global rate limiting service;
        transmit a global rate limiting check to the global rate limiting service that includes the converted request;
        receive a response from the global rate limiting service that indicates whether the request is rate limited; and
        process or reject the request based on the received response.

16. The system of claim 15, wherein, in response to the request failing the local rate limiting check, rejecting and not processing the request.

17. The system of claim 15, wherein the converting includes:
    extracting header information from the received request.

18. The system of claim 17, wherein the global rate limiting check includes a plurality of descriptor keys.

19. The system of claim 15, wherein the local server is configured to receive and install an update.

20. The system of claim 19, wherein the local server further includes a customer resource definition configured to:
    identify changes to the global rate limiting service that are required from the received update; and dynamically inject the identified changes into the global rate limiting service without restarting the service of the local server.

* * * * *